United States Patent
Wulffen (10) Patent No.: US 8,206,598 B2
(45) Date of Patent: Jun. 26, 2012

(54) METHOD OF PURGING A FLUID LINE

(76) Inventor: Gregory Wulffen, West Islip, NY (US)

(*) Notice: Subject to any disclaimer, the term of this patent is extended or adjusted under 35 U.S.C. 154(b) by 654 days.

(21) Appl. No.: 12/363,574

(22) Filed: Jan. 30, 2009

(65) Prior Publication Data

US 2010/0193044 A1   Aug. 5, 2010

(51) Int. Cl.
    *B01D 24/46* (2006.01)
(52) U.S. Cl. .................. 210/791; 210/797; 210/798
(58) Field of Classification Search .............. 210/791, 210/797–798, 106, 108
    See application file for complete search history.

(56) References Cited

U.S. PATENT DOCUMENTS

| | | | | |
|---|---|---|---|---|
| 1,855,494 A | * | 4/1932 | Sorensen | 277/614 |
| 2,797,029 A | * | 6/1957 | Beaver | 222/260 |
| 3,236,190 A | * | 2/1966 | Erickson | 417/468 |
| 4,336,958 A | * | 6/1982 | Goetzinger | 285/55 |
| 4,951,784 A | | 8/1990 | Bedi | |
| 5,056,559 A | | 10/1991 | Golembiski | |
| 5,090,451 A | | 2/1992 | Buchanan et al. | |
| 5,190,120 A | | 3/1993 | Watts | |
| 2001/0032754 A1 | | 10/2001 | Bedi et al. | |
| 2003/0127112 A1 | | 7/2003 | Durocher et al. | |
| 2006/0257806 A1 | | 11/2006 | Crichton | |
| 2007/0062562 A1 | * | 3/2007 | Leaphart | 134/21 |

* cited by examiner

*Primary Examiner* — Chester Barry
(74) *Attorney, Agent, or Firm* — Harold G. Furlow, Esq.

(57) ABSTRACT

An adapter for the purging of lines is described that comprises a plate and an attachment mechanism. The plate includes a first side and an opposed second side that are connected by at least one edge. The plate has a first interface defined on the second side that is adapted to connect to a portion of a cap of a filter assembly in a close fitting relation. The first interface is also adapted to define an interior space between the portion of the cap and the plate. The interior space is in fluid communication with a first line that is connected to the filter assembly. The attachment mechanism secures the plate and the portion of the cap in the close fitting relation. The plate includes a second interface that is adapted to connect to an external source of pressure. The second interface is in fluid communication with the interior space.

10 Claims, 5 Drawing Sheets

PRIOR ART

FIG. 3

PRIOR ART

METHOD OF PURGING A FLUID LINE

BACKGROUND OF THE INVENTION

1. Field of the Invention

The present disclosure relates to devices that facilitate the maintenance of fluid systems and in particular, to an adapter that connects to a filter for the purging of a line of a fluid system.

2. Description of the Related Art

Oil heating systems are one example of a common fluid system that employs a pump that draws a fluid from a tank through a feed or input line to the pump. An oil filter is located upstream in the input line from the pump that filters out undesirable particles from the oil. Problems occur in fluid systems, such as in this example when the input line upstream from the filter gradually becomes clogged with deposits from the oil. This is a sizable problem for oil systems because it reduces the flow of oil through the input line. This strains the pump and reduces the efficiency of the overall system. As a result of this problem, oil lines are routinely purged as part of a maintenance program.

The purging of oil lines is a burdensome process. For example, in order to purge the line from the oil tank to the filter of an oil burning home heating system a technician closes a first in-line valve in proximity to the oil tank and disconnects the line at a second in-line valve in proximity to the oil filter. A hand pneumatic push-pump is connected to the disconnected line, the push-pump is pressurized and the first in-line valve is opened. The pump supplies a flow of pressurized air into the input line that forces or purges the oil and oil deposits from the line into tank. This process is then reversed for the normal operation of the oil system. The disconnecting, purging and reconnecting process is excessively time consuming due to complications that include the first in-line valve in proximity to the oil tank being located external to the structure of the building, at a remote section inside the structure or barely accessible due to clutter surrounding the tank. Technicians have to make multiple trips between the remote first in-line valve in proximity to the oil tank and the broken line in proximity to the oil filter in order to perform this maintenance.

Heretofore there has never been a reliable device and/or method for the process of purging oil filter input lines without the time consuming process of breaking the line and the associated requirement for the repeated opening and closing of a remote shut off valve.

SUMMARY OF THE INVENTION

An adapter for the purging or clearing of fluid lines is described that comprises a plate that includes a first side and an opposed second side that are connected by an edge. The second side of the plate includes a first interface that is adapted to connect to a cap of a filter assembly in a close fitting relation. The first interface is also adapted to define an interior space between a portion of the cap and the plate that is in fluid communication with a first line that connects to the filter assembly. The adapter includes an attachment mechanism that secures the plate and the portion of the cap in the close fitting relation. The plate includes a second interface that is adapted to connect to an external source of pressure. The second interface is in fluid communication with the interior space.

The attachment mechanism can include a fastener. The attachment mechanism can also include a threaded aperture in the plate that is adapted to connect to threads on a tubular extension of the cap. The second interface includes an aperture that is in fluid communication with the interior space. The attachment mechanism can include a fastener and an aperture in the plate wherein the fastener is positionable through the aperture in the plate and the fastener is adapted to secure the plate and the cap in the close fitting relation. The plate includes a layer on the second side. The interior space is in fluid communication with an input port of the cap and isolates the interior space from an output port of the cap.

A second adapter for the purging of an input line to a filter assembly is described that comprises a plate and an attachment mechanism. The plate includes a first side and an opposed second side that are connected by at least one edge. The plate defines a first interface on the second side that is adapted to connect to a cap of a filter assembly in a close fitting relation. The first interface also defines an interior space between the cap and the plate. The interior space is in fluid communication with an input port of the cap and an input line to the filter assembly and isolated from fluid communication with an output port of the cap. The plate includes an attachment mechanism that secures the plate and the portion of the cap in the close fitting relation. The plate defines a second interface on the first side of the plate that is adapted to connect to an external source of pressure. The second interface is in fluid communication with the interior space.

The attachment mechanism includes a fastener that is adapted to secure the connection of the plate and the portion of the cap in the close fitting relation. The attachment mechanism includes a threaded aperture in the plate that is adapted to connect to a threaded tubular extension of the cap. The attachment mechanism is adapted to secure the plate and the portion of the cap in the close fitting relation.

A method of purging a fluid line or tube for the passage of fluids is described comprising the steps of providing a filter assembly connected to a fluid system. The filter assembly has a housing that includes a first portion and a second portion. The filter assembly has a first port in fluid communication with a first line and a second port.

A first step of positioning a second side of a plate in contact with the first portion of the housing. The second side is adapted to interface with the external interface of the first portion in a close fitting relation that also defines an interior space between the plate and the first portion. The interior space is in fluid communication with the first port and the first port is in fluid communication with a first line. The interior space is isolated from fluid communication with the second port of the housing. The interior space is in fluid communication with an external interface of the plate.

The method also includes using the attachment mechanism to secure the second side of the plate and the first portion in the close fitting relation. The method also includes connecting an external source of pressure to the external interface and using the external source of pressure for the pressurizing of the interior space, first port and first line and the purging of the first line.

The using of the attachment mechanism can include using a fastener to secure the plate and the first portion in the close fitting relation. The using of the attachment mechanism includes securing a substantially fluid tight seal between the second side of the plate and the first portion that defines the interior space. The using of the attachment mechanism can include using a threaded connection in the plate to secure the plate and first portion together in the close fitting relation. The using of the external source of pressure further includes using the external source of pressure to introduce air under increased pressure into the interior space and first line to purge the first line. The using of the attachment mechanism can further include using a fastener and a retention device to secure the second side of the plate and the first portion in the close fitting relation. The using of an external source of pressure can further include using the external source of pressure to introduce air under decreased pressure into the first line to draw fluid into the first line. The using of the attachment mechanism includes making a substantially fluid tight seal between the second side of the plate and the first portion that defines the interior space. The step of providing can further include a housing that has a cap that is the first portion and a canister that is a second portion. The step of providing can further include a housing that has a cap as a second portion and a canister as a first portion.

BRIEF DESCRIPTION OF THE DRAWINGS

Preferred embodiments of the disclosure are described below with reference to the drawings, wherein like numerals are used to refer to the same or similar elements.

DETAILED DESCRIPTION OF THE INVENTION

Figure 1:
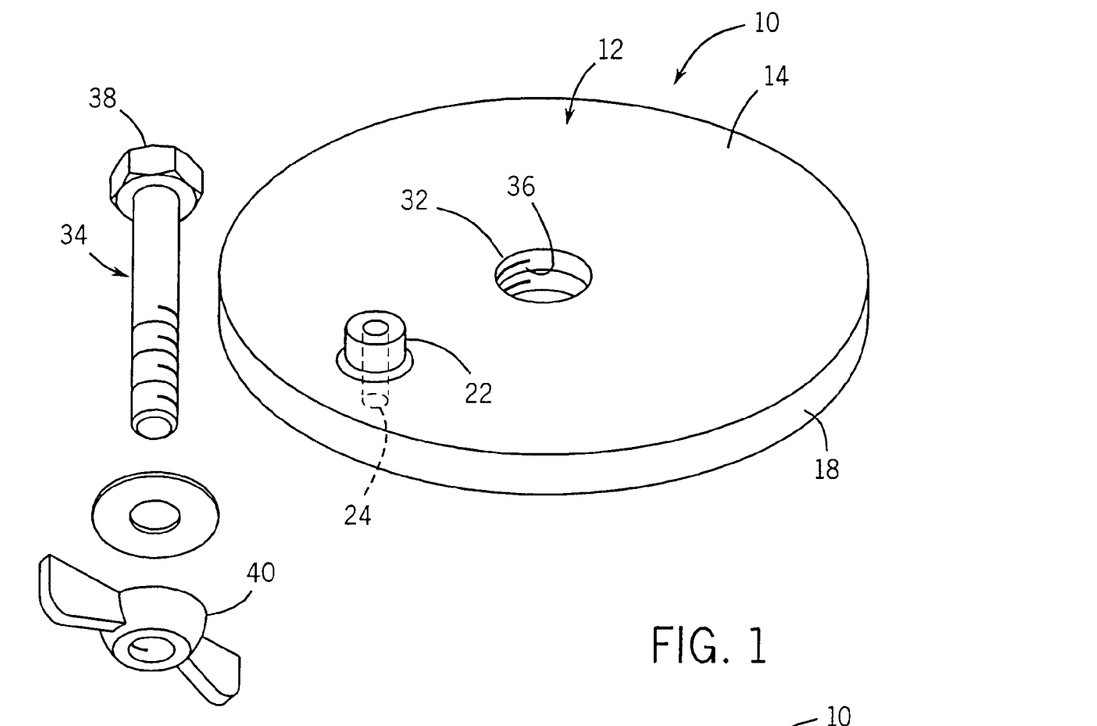
FIG. 1 is a perspective view of a first side and an edge of the adapter constructed in accordance with the present invention.
Figure 2:
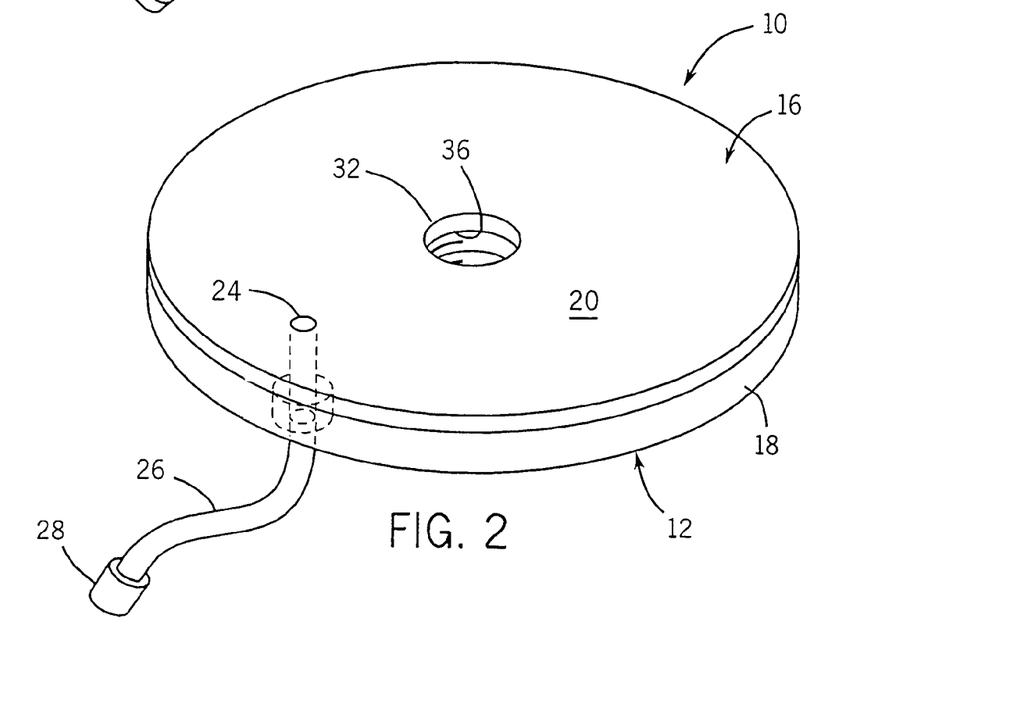
FIG. 2 is a perspective view of a second side and the edge of the adapter of FIG. 1.

Referring initially to FIGS. 1 and 2, a push-pull pump adapter 10 comprises a plate 12 that has a first side 14 and an opposed second side 16. An edge 18 connects first side 14 and second side 16. Second side 16 can selectively include a layer 20. In the preferred embodiment, second side 16 defines a plane that is perpendicular to a central axis of plate 12.

Plate 12 has a connector 22 on first side 14 that is in fluid communication with an aperture 24 that extends between first side 14 and second side 16. Connector 22 can also include a line 26 that provides fluid communication between connector 22 and a second connector 28. The length and/or flexibility of line 26 can vary depending upon the intended application of push-pull pump adapter 10. Connector 22 and aperture 24 individually or in combination with line 26 and connector 28 provide a fluid tight coupling with an external source of pressure 29 (see FIG. 5).

Push-pull pump adapter 10 connects to one or more external devices, such as for example a portion of an oil filter assembly 48 (See FIGS. 3 and 4) for the purging of a line. Second side 16 defines an adapter interface that connects in a close fitting relation with one or more of the external interfaces of the different external devices. As defined herein, the close fitting relation is between the adapter interface of second side 16 and the external interface of the external device.

Plate 12 is preferably made of one or more of a broad variety of materials that define the close fitting relation with the external devices. The materials of plate 12 can be natural and/or man made materials that include metals, polymers, cellulose and treated and/or cellulose-based products, ceramics, glass compounds and composites. In one preferred embodiment, plate 12 is made of a relatively soft metal such as aluminum or iron. The materials of plate 12 and/or any coatings on plate 12 are sufficiently compatible with oil products to perform the functions defined herein. Push-pull pump adapter 10 can be a disposable or a reusable device.

Push-pull pump adapter 10 includes an attachment mechanism that secures plate 12 to the external device. The attachment mechanism secures the adapter interface of second side 16 to one or more different configurations of external interfaces of the external devices in the close fitting relation.

In the preferred embodiment of the attachment mechanism, plate 12 includes an aperture 32 and/or a fastener 34. Aperture 32 preferably is an approximately (1) inch diameter through hole that is aligned with the central axis of plate 12. The inner surface of the arcuate wall that defines aperture 32 can also define threads 36. Plate 12 preferably has a diameter of approximately three and one half (3½) inches, but it is understood that the dimensions of plate 12 can vary depending upon the intended application of push-pump adapter 10 with an external device.

In one preferred embodiment of the attachment mechanism, a fastener 34 secures plate 12 and the external device in the close fitting relation. Fastener 34 is preferably a bolt that includes a head 38 and a retention device 40. The shaft of fastener 34 fits through aperture 32 and head 38 preferably has a width perpendicular to the shaft that is greater than the diameter of aperture 32. As required, a washer or a similar mechanical device can be included to aid in the load bearing and/or retention of head 38 against first side 14. Fastener 34 in this preferred embodiment includes a retention device 40 that secures plate 12 in close relation with the external device. Retention device 40 can be any known type of connector for fastener 34 to include, for example, a threaded nut that engages the threads on the shaft of fastener 34 or a cotter key that engages and secures the shaft of fastener 34 in position with the external device. Fastener 34 and retention device 40 can be integrated into a single assembly such as a selectively retractable and expandable molly bolt type apparatus.

An alternative embodiment of fastener 34 can include a line such as a wire, for example, that secures plate 12 to the external device. Retention device 40 can be included as an integral part of fastener 34 as a clip, hook or tie, for example that can be employed to secure fastener 34 and plate 12 to the external device in the close fitting relation. A line as defined herein can include any elongate member fabricated of materials such as natural fibers, polymers, metals, composites and glass based materials. It is understood that retention device 40 in this embodiment as well as others can include an integrally connected or monolithically formed portion of fastener 34 that in one example can expand to secure the close fitting relation. The line is preferably a flexible fastener 34 and is defined herein as on of the fastening devices that can be used as attachment mechanism means.

Second side 16 of plate 12 preferably has a flat planar surface, but it is understood that plate 12 can have any structural shape that functions to provide a close fitting relation for the adapter interface of second side 16 with the external interfaces of the external devices. Thus, plate 12 can have a cylindrical, concave, tubular, convex or an angular shape that varies the proportional relationships of first side 14, second side 16 and edge 18, but retains the function of an adaptive interface that provides the close fitting relation with one or more external interfaces of the external devices. Similarly, edge 18 is preferably circular, but adapter 10 can have any number of edges or sides 18.

In alternative embodiment of the attachment mechanism, plate 12 is a solid disc that omits aperture 32 and includes fastener 34. In this embodiment, fastener 34 is a bolt that is connected to plate 12, extends from second side 16 approximately perpendicular to plate 12 and is preferably centrally aligned. Fastener 34 and retention device 40 are used to secure the integrated assembly of plate 12 and the external device in the close fitting relation.

In addition, plate 12 can also include a viewing port into the interior space that is made of transparent or translucent materials. Plate 12 can further selectively include a removable receptacle that is in fluid communication with the interior space that receives and retains oil. Similarly, while it is understood that aperture 24 is defined as a through hole between first side 14 and second side 16, aperture 24 in an alternative equivalent arrangement can also extend between second side 16 and edge 18.

Layer 20, when present, assists second side 16 in providing the close fitting relation with the external interface of the external device. Layer 20 is preferably constructed of a flexible and/or resilient material that can be selectively employed to aid the formation of the approximately substantially sealing interface. Layer 20 can be a disc, a coating, a washer or an o-ring, for example, depending upon the intended application of push-pull pump adapter 10. Layer 20 can be a separate assembly that is removably connected or permanently connected to plate 12. Layer 20 is preferably constructed of one or more oil compatible materials such as nylon.

Figure 3:
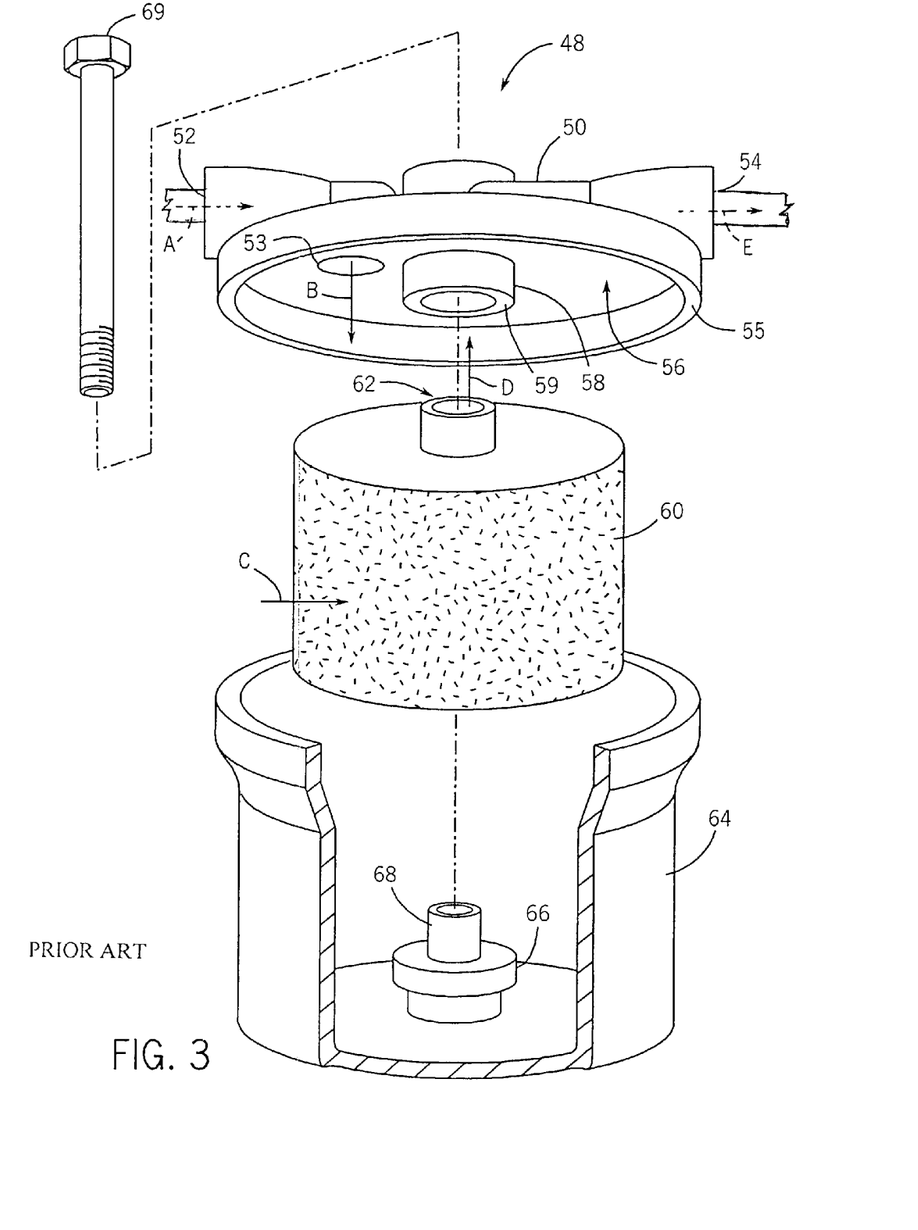
FIG. 3 is an exploded, partially cut away side view of a first exemplary prior art oil filter assembly constructed in accordance with the present disclosure.

As shown in FIG. 3, a first standard external device is an oil filter assembly 48 for an oil system that includes a cap portion 50, a tubular oil filter 60 and a canister portion 64. Cap 50 has a first configuration of the plurality of external devices that define different external interfaces. Cap 50 has an input port 52 for a first oil line that exits from cap 50 through a port 53 into the interior of oil filter assembly 48. An output port 54 of cap 50 connects to a second oil line. Cap 50 is a walled lid that that includes a rim 55 with an outside diameter that is approximately three and three eights (3⅜) inches. Cap 50 has an approximately concave shape that defines an interior space 56 between an outside surface of the tubular wall of centrally aligned tubular extension 58 and an inside surface of rim 55. Tubular extension 58 defines a centrally aligned aperture that is a through hole that extends through the center of cap 50. Tubular extension 58 has an inside diameter of approximately one (1) inch and a tubular wall that is approximately one eighth (⅛) of an inch thick. Rim 55 has an approximately flat edge that defines a plane with a rim 59 of tubular extension 58. Rim 55 and rim 59 define a first external interface of oil filter assembly 48.

Tubular oil filter 60 has a tubular wall that filters the oil and defines an aperture 62 that extends between a first end portion and an opposed second end portion. Aperture 62 is aligned with the through hole defined in tubular extension 58 and is in fluid communication with output port 54. The first end portion of filter 60 makes a fluid tight seal with cap 50. Cap 50 and canister 64 connect to form a sealed outer housing of oil filter assembly 48.

Canister 64 has a tubular wall that has a first end portion that defines a rim for an opening and a second end portion that connects to a bottom wall. The rim of canister portion 64 interfaces with rim 55 of cap portion 50 to provide a fluid tight housing for filter assembly 48. The bottom wall connects to a centrally aligned base extension 66 and a centrally aligned tubular extension 68 that make a fluid tight seal with the second end portion of filter 60. Tubular extension 68 is positionable in aperture 62 of oil filter 60. Tubular extension 68 extends from base 66 and includes threads that interface with the threads of a bolt 69. Bolt 69 extends through the centrally aligned aperture in cap 50, tubular extension 58, aperture 62 of filter 60 and connects with tubular extension 68 to draw cap 50 and canister or second portion 64 together to form a fluid tight housing for oil filter assembly 48.

The dimensions of oil filter assembly 48 can vary depending upon the application of the filter system. For example, in the first standard configuration of filter assembly 48, rim 55 of cap or first portion 50 has an outside diameter of approximately three and three eight (3⅜) inches and in a second standard configuration of filter assembly 48, rim 55 has an outside diameter of approximately four and one eighth (4⅛) inches. Caps 50 of the first and second configurations connect to a dimensionally corresponding rim of canister 64. It is understood however, that the dimensions of standard oil filter assembly 48 can include additional variations and that plate 12 of push-pull pump adapter 10 can accommodate changes in dimension, configuration or external interface of filter assembly 48 to include defining an external interface to canister 64 as well as to the external interface of cap 50.

Arrow A shows the flow of the input oil into port 52 from a first oil line and through an interior port 53 of cap 50 as shown by arrow B. The flow of arrow B is directed into an annular cavity defined between the inside of the tubular wall of canister 64, inside wall of cap 50, outwardly facing wall of tubular extension 58 and the outer surface of filter 60. This annular cavity is a reservoir of oil that is drawn through filter 60 as shown by arrow C, through aperture 62 of filter 60 as shown by arrow D, into tubular extension 58 that is in fluid communication with output port 54 as shown by arrow E and into the second oil line.

Figure 4:
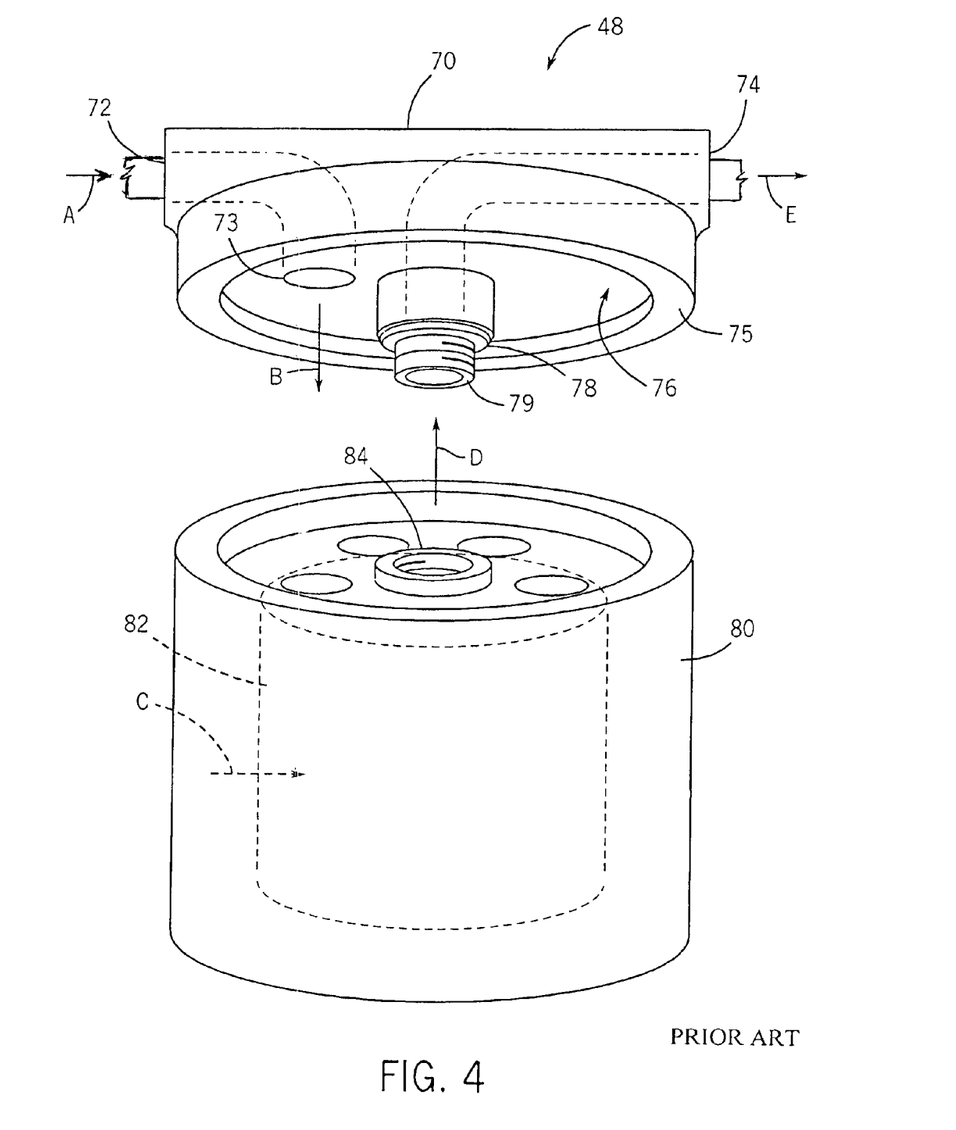
FIG. 4 is an exploded, partially cut away side view of a second exemplary prior art oil filter assembly constructed in accordance with the present disclosure.

Referring now to FIG. 4, a second embodiment of the external device is a standard in-line oil filter assembly 48 includes a cap portion 70 and a canister portion 80. Cap 70 has an input port 72 for the first oil line that is in fluid communication with a port 73 that is directed to the interior of filter assembly 48. An output port 74 of cap 70 connects to the second oil line. Cap 70 is a walled lid that includes a rim 75 that interfaces with canister 80. Rim 75 has an outside diameter of approximately three (3) inches and a thickness of approximately three eighths (⅜) of an inch. Cap 70 defines an interior space 76 between the outside surface of the tubular wall of centrally aligned tubular extension 78 and the inside surface of rim 75. The tubular wall of tubular extension 78 includes a first portion with a first outside diameter of approximately one and one quarter (1¼) inch and a second portion that has a second outside diameter that is approximately one (1) inch and includes threads on the outer surface. The first and second portions extend outwardly along the centerline of cap 70 with the second portion defining a terminal end or rim 79 that extends beyond the edge of rim 75.

Canister 80 includes a fixed filter 82 that has a tubular wall that connects to a solid bottom wall and a porous top wall. Canister 80 and cap 70 connect to form a sealed outer housing of oil filter assembly 48. The top wall of canister 80 defines a centrally aligned aperture 84 that is a through hole. The inside surface of the top wall that defines aperture 84 includes threads that couple with the threads on the second portion of tubular extension 78. Cap 70 and canister 80 are connected into a fluid tight housing assembly by the threaded connection between aperture 84 and the second portion of tubular extension 78 in combination with rim 75 of cap 70 and the edge of the tubular wall of canister 80.

Continuing with the second embodiment of the external device, arrow A shows the flow of the input oil into port 72 and through port 73 as shown by arrow B. The flow of arrow B is directed into an annular cavity that is defined by the inside of the tubular wall of canister 80, inside wall of cap 70, the outer wall of tubular extension 78 and the outer surface of filter 82. This annular cavity is a reservoir of oil that is drawn through filter 82 as shown by arrow C, drawn through aperture 84 of the top wall of the canister as shown by arrow D, drawn into tubular extension 78 that is in fluid communication with port 74 as shown by arrow E and into the second oil line.

Figure 5:
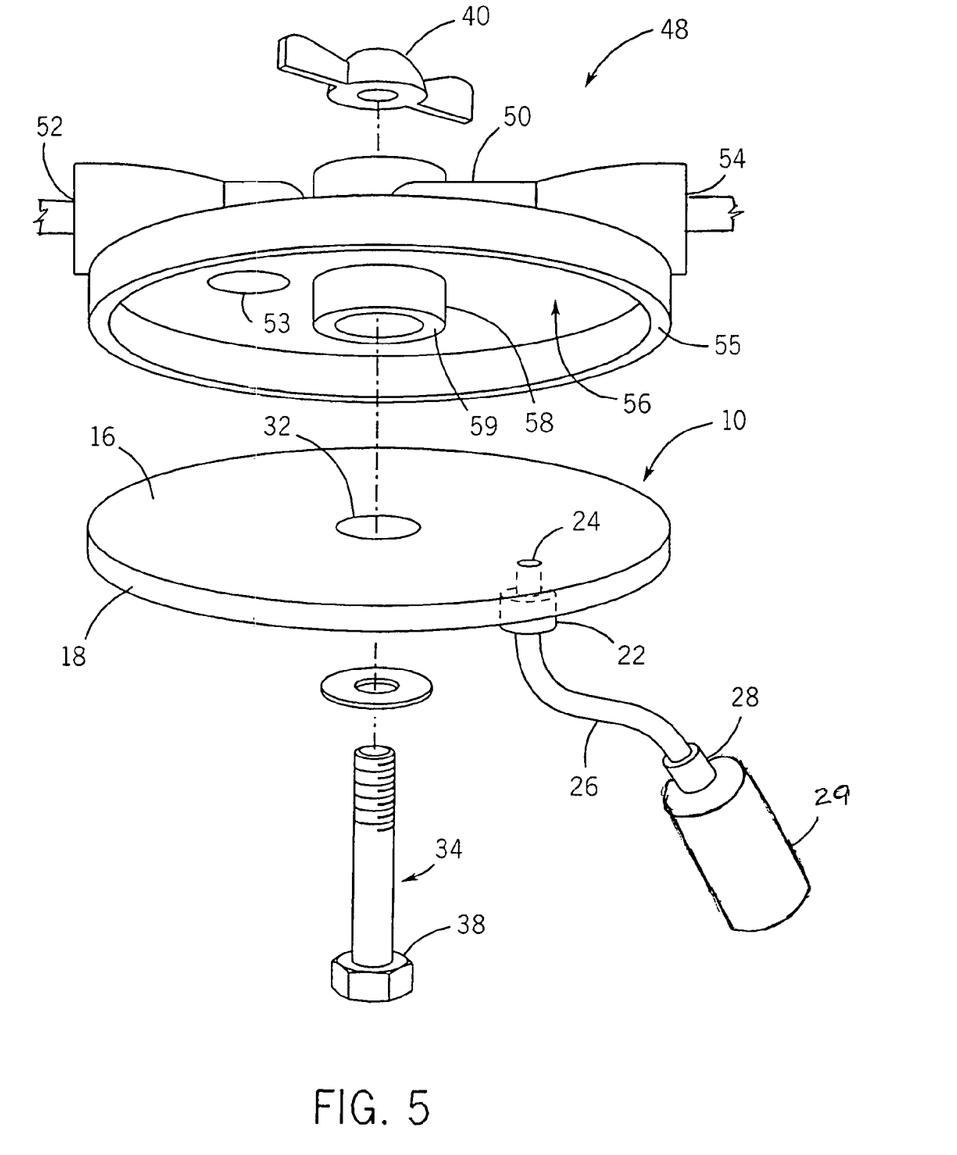
FIG. 5 is an exploded view of the adapter of FIG. 1 connecting to a cap of the first oil filter.

As shown in FIGS. 3 and 5, in operation the flow of oil from an oil tank to filter assembly 48 is closed using a shut off valve in the first line or input line of the fluid system that is in proximity to filter assembly 48. Bolt 69 is loosened and canister 64 separated from cap 50. Second side 16 of plate 12 of push-pull pump adapter 10 is positioned in direct contact with rim 55 and rim 59 of cap 50. Second side 16 can include layer 20 and interfaces with rim 55 and rim 59 in the close fitting relation. The approximately three and three eights (3⅜) inch outside diameter of rim 55 contacts side 16 preferably in proximity to the approximately three and one half (3½) inch outside diameter of plate 12. Rim 59 has an inside diameter of approximately one (1) inch and a thickness of approximately one eighth (⅛) inch. The face or thickness of rim 59 contacts side 16 in proximity to the approximately one (1) inch inside diameter of aperture 32 and accommodates a sufficient interface for the close fitting relation. Interior space 56 includes a portion of cap 50 that has an approximately annular shape that is defined by inside surface of the wall of cap 50, outside surface of the wall of tubular extension 58 and second side 16. Aperture 24, input port 52 and port 53 are in fluid communication with space 56. Aperture 32, the aperture defined in tubular extension 58 and output port 54 are isolated from and not in fluid communication with interior space 56.

In this one preferred embodiment of the attachment mechanism, fastener 34 is passed through aperture 32 of plate 12, the aperture defined by tubular extension 58 and the outer surface of cap 50. In this embodiment, fastener 34 is a bolt 34 and as required, fastener 34 can include a washer or other devices that provide a bearing surface for retention device 40 and/or head 38. Retention device or nut 40 is connected to the threaded end of bolt 34 and is rotated to firmly connect push-pull pump adapter 10 and cap 50 into the close fitting relation. Retention device 40 is shown as a threaded wing nut that mates with the threads of fastener 34 to secure cap 50 and plate 12 together, but it is understood that retention device 40 can vary and encompasses any other means for the retention of fastener 34.

The attachment mechanism, fastener 34 in this one embodiment, maintains the close fitting relation between cap 50 and push-pull pump adapter 10 with sufficient force to sustain the close fitting relation that approximates a fluid tight seal. A close fitting relation as defined herein is at least a substantially sealing interface sufficient for the operation of push-pull pump adapter 10. In operation, the external source of pressure 29 can build up and/or maintain a sufficient pressure that can tolerate predefined limited pressure losses and still have the pressure to perform the purging function described herein. In this preferred embodiment, this interface limits the risk of pressurized fluid flow into the second line and any unintentional leakage of pressurized air from interior space 56 to rim 59 and/or rim 55 can vent to the external environment rather than through tubular extension 58, the second line and towards the pump.

Connector 22 and/or connector 28 at the terminal end of line 26 are adapted to couple with an external source of pressure 29, such as a manual selectively alternating push-pull pump, that is commonly used for the maintenance of oil heating systems. Additional alternative external sources of pressure includes any other pneumatic pump or alternative sources of air or other fluids that can be coupled to connector 22 or connector 28 for the selective pressurization and/or reduction of pressure of the first line. In this preferred embodiment, it is critical for the integrity of oil lines of heating systems that the purging be limited to relatively low pressures appropriate for the oil tubing employed in the system.

The external source of pressure 29 is coupled to connector 28, the pressurization process is initiated and the shut off valve is opened in the first line in proximity to filter assembly 48. The increasing pressure through port 53, port 52 and into the first line displaces the oil and oil residue in the first line back into the oil tank. Once the line is blown clear, the push pump is used to draw oil back into the first line and at least in proximity to the oil filter assembly 48. When the flow of a sufficient amount of oil through the first line is noted, the in-line shut off valve in proximity to the oil filter is closed to stop the flow of oil into oil filter assembly 48. Push-pull pump adapter plate 10 is disconnected from cap 50 by removing retention device 40. Canister 64 is connected to cap 50 using bolt 59 and the shut off valve is opened to restore the flow of oil.

Figure 6:
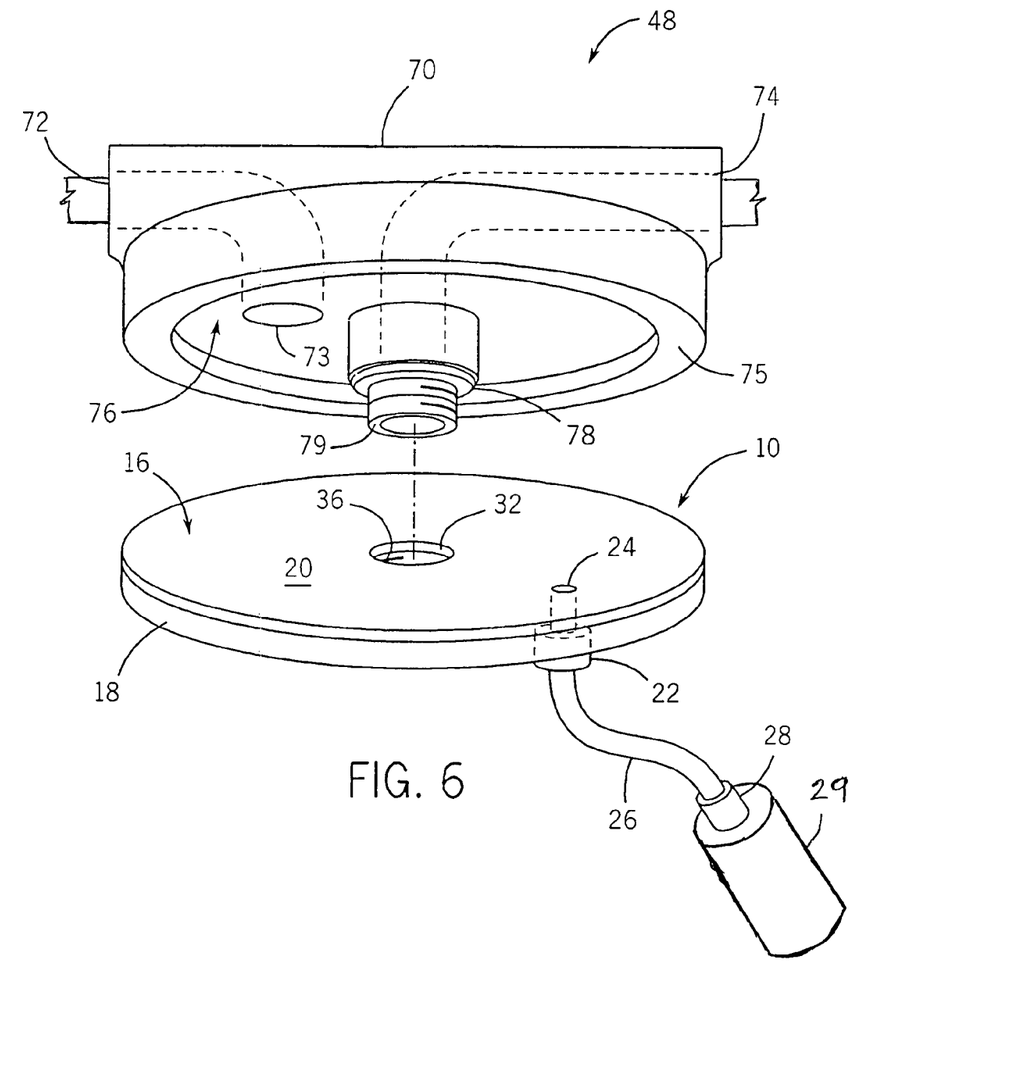
FIG. 6 is an exploded view of the adapter of FIG. 1 connecting to a cap of the second oil filter.

As shown in FIGS. 4 and 6, the shut off valve is closed as described previously and canister 80 is rotated and disengaged from cap 70. Second side 16 of push-pull pump adapter 10 is directed towards rim 79 of tubular extension 78 and rim 75 of cap 70. Aperture 32 includes threads 36 that mate with the threads on the second portion of tubular extension 78. Plate 12 is rotated to engage with the threads 36 of aperture 32 until the stop between the first portion and second portion of tubular extension 78 and rim 75 are contacted. Plate 12 has a close fitting relation with rim 75 and tubular extension 78 when fully rotated to contact the stop of the first portion of tubular extension 78. Interior space 76 is defined between the inside of the wall of cap 70, outside of the wall of tubular extension 78 and second side 16. Aperture 24, input port 72 and port 73 are in fluid communication with space 76. Aperture 32, the aperture defined by tubular extension 78 and port 74 are isolated or not in fluid communication with space 76. Second side 16 can include a layer 20 that can be constructed to provide an enhanced close fitting relation that can include a fluid tight seal.

Connector 22 and/or connector 28 at the terminal end of line 26 are adapted to couple with the external source of pressure 29, such as the push-pump. The external source of pressure (not shown) is coupled to connector 28 in this one example, the pressurization process is initiated and the shut off valve is opened in the first line in proximity to filter assembly 48. The purging and drawing of oil processes described previously are also done for this second embodiment of oil filter assembly 48. When the flow of oil through the first line and/or push-pull pump adapter 10 is noted, the shut off valve in proximity to oil filter 48 is closed to stop the flow of oil through the first line. Plate 12 is rotated to disconnect from cap 70. Canister 80 is threaded onto and sealingly connected to cap 70 and the shut off valve is opened to restore the flow of oil.

In the preceding specification, the present disclosure is described with reference to specific exemplary embodiments thereof. It will be evident, however, that various modifications, combinations and changes may be made thereto without departing from the broader spirit and scope of this disclosure as set forth in the claims that follow. As one example, the present disclosure is described in terms of a home oil system, but it is understood that push pump adapter 10 can be employed with filter caps 50, 70 or canisters 64, 80 in a broad range of industrial and commercial fluid system applications besides those of oil home heating systems. Similarly, the attachment mechanism can be any device that secures plate 12 and cap 50 and/or cap 70 together in the close fitting relation. In addition, though the present invention is described in terms of a series of embodiments, each embodiment of the present invention can combine one or more novel features of the other embodiments. The specification and drawings are accordingly to be regarded in an illustrative manner rather than a restrictive sense.

What is claimed is:

1. A method of purging a fluid line of a fluid system using an adapter, the method comprising the steps of:
    providing a filter assembly in fluid communication with a fluid system, the filter assembly having a housing that includes a first portion and a second portion, the first portion of the filter assembly having a first port in fluid communication with a first line and a second port in fluid communication with a second line;
    positioning a second side of a plate of an adapter in contact with the first portion of the housing, the second side adapted to interface with the external interface of the first portion in a close fitting relation, the close fitting relation defining an interior space between the plate and the first portion, the interior space in fluid communication with the first line and the interior space in fluid communication with an external interface of the plate, the interior space isolated from fluid communication with the second line;
    using an attachment mechanism to secure the second side of the adapter plate and the first portion in the close fitting relation;
    connecting an external source of pressure to the external interface;
    using the external source of pressure to pressurize the interior space, the first port and the first line; and
    pressurizing the interior space, first port and first line to purge the first line.

2. The method of purging a fluid line of claim 1, wherein the step of using the attachment mechanism further includes using a fastener to secure the plate and the first portion in the close fitting relation.

3. The method of purging a fluid line of claim 1, wherein the step of using the attachment mechanism includes forming a substantially fluid tight seal between the second side of the plate and the first portion that defines the interior space.

4. The method of purging a fluid line of claim 1, wherein the step of using the attachment mechanism includes using a threaded connection in the plate and in the first portion to secure the second side the plate and first portion together in the close fitting relation.

5. The method of purging a fluid line of claim 1, wherein the step of using the external source of pressure further includes using the external source of pressure to introduce air under increased pressure into the interior space and first line to purge the first line.

6. The method of purging a fluid line of claim 1, wherein the step of using the attachment mechanism includes using a fastener and a retention device to secure the second side of the plate and the first portion in the close fitting relation.

7. The method of purging a fluid line of claim 1, wherein the step of using an external source of pressure further includes using the external source of pressure to withdraw air under decreased pressure from the first line to draw fluid into the first line.

8. The method of purging a fluid line of claim 1, wherein the step of using the attachment mechanism includes making a substantially fluid tight seal between the second side of the plate and the first portion that defines the interior space.

9. The method of purging a fluid line of claim 1, wherein the step of providing includes the housing including a cap and a canister, the first portion of the housing is the cap.

10. The method of purging a fluid line of claim 1, wherein the step of providing includes the housing including a cap and a canister, the second portion of the housing is the canister.

* * * * *